Patented Oct. 10, 1922.

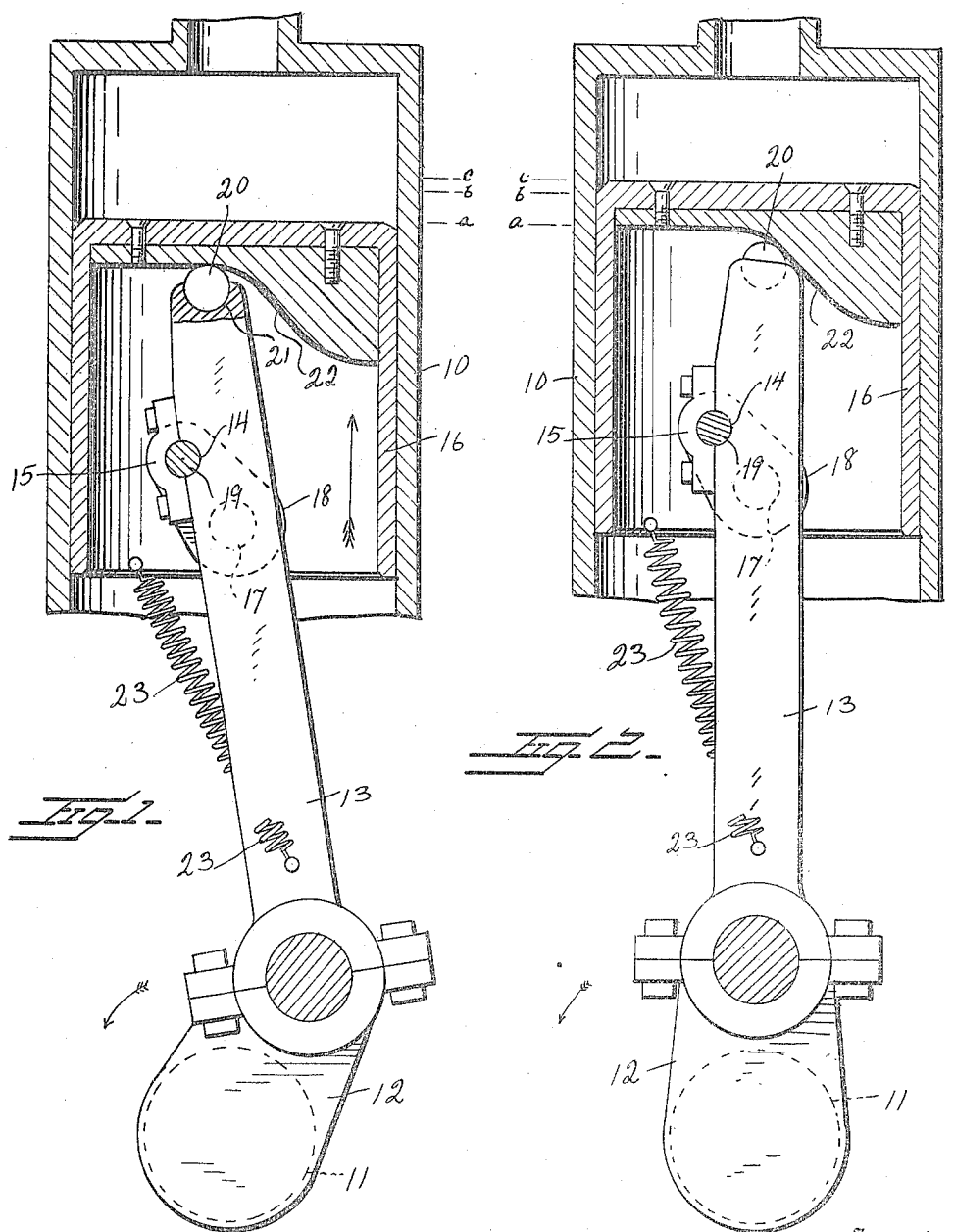

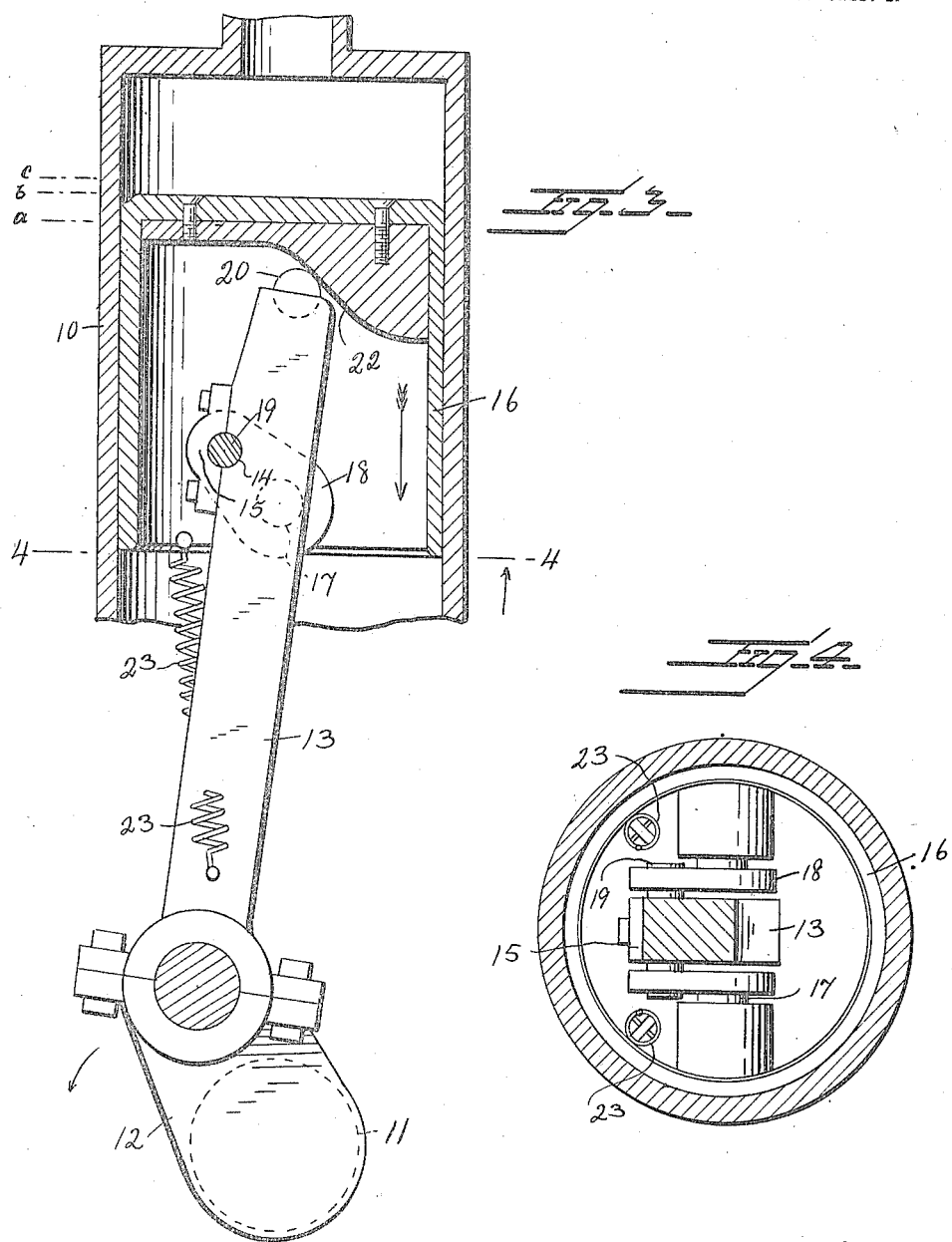

1,431,617

UNITED STATES PATENT OFFICE.

ERNEST L. YOUNG, OF OLATHE, COLORADO.

PISTON ACTION FOR GAS ENGINES.

Application filed March 15, 1919, Serial No. 282,799. Renewed February 25, 1922. Serial No. 539,295.

*To all whom it may concern:*

Be it known that I, ERNEST L. YOUNG, a citizen of the United States, residing at Olathe, in the county of Montrose and State of Colorado, have invented certain new and useful Improvements in Piston Actions for Gas Engines, of which the following is a specification, reference being had to the accompanying drawings.

This invention relates to internal combustion engines, and particularly to the piston and crank mechanism thereof.

In all types of explosion engines known to me, the ignition and explosion occurs immediately after the crank has passed its center in order that the compression shall not be lost with a consequent loss of power. This requirement causes a loss in efficiency, as in order to secure the greatest efficiency, the explosion should take place at a point where the crank has considerably passed its center so that the greatest leverage may be secured upon the crank shaft.

The general object of my invention is to secure both of these desiderata by having the explosion take place after the crank has appreciably passed the dead center thereof but while the piston is in nearly the same position which is occupied when the crank was at its dead center. In other words, my object is to so construct the crank rod and the piston of an internal combustion engine that the piston will move outward from its innermost position to an extremely slight distance, while the crank is passing from a dead center to a position off center and the crank rod has moved a much greater distance than the cylinder or than the piston.

A further object is to provide means for holding the piston in engagement with the piston rod during the suction stroke, while permitting the piston to have a movement relative to the piston rod upon all other strokes of the piston.

Still another object is to so construct the piston and piston rod that the piston rod shall have a movement relative to the piston and that the piston rod when the crank moves from its dead center to a position off center, shall act to relatively shift the piston inward into the cylinder with relation to the crank rod, thus holding the piston from any but a very slight movement relative to the cylinder while the crank is rotating from a dead center to a position off center and thus compensate for the downward movement of the piston rod during this period.

Other objects will appear in the course of the following description.

My invention is illustrated in the accompanying drawings, wherein:—

Figure 1 is a longitudinal sectional view of a piston action constructed in accordance with my invention;

Figure 2 is a like view to Figure 1, but showing the piston at the end of its stroke;

Figure 3 is a like view to Figure 2 but showing the position of the parts when the crank has passed its midstroke and the piston is moving outward; and Figure 4 is a section on the line 4—4 of Figure 3.

It will be understood that these views as above described are to a large extent diagrammatic and do not show any of the usual or ordinary details of construction, such as are commonly present in internal combustion engines.

Referring to these drawings, 10 designates the cylinder of an internal combustion engine of any suitable type or character, but the drawing not illustrating the inlet and exhaust valves or the ignition means, as these form no part of my invention and may be, of course, of any ordinary or usual construction. The crank shaft is designated 11 and carries the usual crank 12 operating the connecting rod or piston rod 13. The piston rod adjacent its piston engaging end has formed in its side face a bearing 14, the piston rod being recessed for this purpose and being provided with a cap 15. Reciprocating in the cylinder 10 is the piston 16 which is the usual trunk piston, and operatively mounted in the piston 16 is a diametrically extending crank shaft 17 having the crank arms 18 and the wrist pin 19. This wrist pin 19 passes through the bearing 14. It will thus be seen that the piston rod and piston have relative longitudinal movement and relative transverse movement to an extent limited by the length of the crank arm 13. The piston rod 13 extends beyond its point of connection to the wrist pin 19 and carries at its end a roller 20. I do not wish to be limited to any particular manner of mounting this roller in the extremity of the piston rod, but I have illustrated the piston rod as being recessed, as at 21, and the roller 20 which may be in the form of a cylinder or have a spherical form, is disposed in this recess and held therein, as by overturning one wall of the recess sufficiently to prevent the escape of the roller.

It will be seen that I connect the piston rod to the piston, not by a straight, transversely extending wrist pin, but by a crank-shaped wrist pin so that, as before stated, the piston rod may have certain relative movement with relation to the piston itself. The head of the piston 16 is formed with a cam-shaped inner face 22, that is this inner face is transversely inclined outward in a direction parallel to the direction of rotation of the crank 11. This bevelled inner face may be slightly curved, or may be perfectly straight, and it is designed to be engaged by the roller 20 at all times.

For the purpose of holding the piston with its end face 22 against the roller 20 at all times, and particularly upon the suction stroke of the piston, I provide a pair of coiled contractile springs 23 which, at their inner ends, are attached to the skirt of the piston and which, at their outer ends, are attached to the opposite edge face of the pistod rod. These springs, therefore, urge the piston outward relative to the piston rod and when the piston rod moves outward from the cylinder upon the suction stroke of the engine, the springs will cause the piston to follow the piston rod.

The operation of my invention is as follows:—In Figure 1 the crank is shown as moving in its last quarter, and the piston is moving inward with the roller 20 moving across the horizontal part of the piston face 22, and when the crank has reached its dead center, as illustrated in Figure 2, the piston rod will have moved in as far as is possible for it to move in, but the roller 20 has shifted the piston inward a little further, this movement of the piston relative to the crank being permitted by the crank-shaped wrist pin 17, 18 and 19. After the crank has passed its dead center, as illustrated in Figure 3, the explosion occurs and the piston is pushed outward. As the crank moves from the position shown in Figure 3 in its first quarter, the roller 20 will travel along the face 22 of the piston wall and then as the crank moves from the second quarter of its rotation to the third quarter, the roller 20 will move backward or reversely upon the face 22 until at the end of the fourth quarter, the roller will be approximately in the position shown in Figure 1.

The track formed by the inclined face 22 must be disposed at such an angle to the axis of the piston that the piston shall be held from any but a slight outward movement while the crank is passing from the dead center to the proper point for the explosion. The angle of this face 22 will determine the extent of movement of the piston while the crank is passing from the position shown in Figure 2 to the position shown in Figure 3, and the steeper this angle of the face 22, the less will be the outward movement of the piston.

As illustrated in the figures, $c$ designates the furthest inward movement of the piston, and it will be seen that while the crank is moving from the position shown in Figure 1 to the position shown in Figure 2, the piston moves from the point $a$ to the point $c$, or a distance on the drawing of approximately half an inch, and that while the piston is moving from the position shown in Figure 2 to the position shown in Figure 3, that is while the crank arm 12 is moving through the same angular distance, as it moved from Figure 1 to Figure 2, the piston has only moved down to the line $b$ and if the incline 22 is made steeper, the movement of the piston outward while the crank is moving from the position shown in Figure 1 to the position shown in Figure 2, will be still less than that illustrated.

But this construction, compression is retained or only very slightly reduced until the crank has passed a considerable distance beyond the dead center and thus I secure more power from the engine with the same amount of gas without reducing very slightly the maximum compression.

Another vital point of my invention resides in the ease with which the roller 20 travels up the relatively steep inclined face 22. This is permitted by the under swing of the crank-shaped wrist pin 18. This crank-shaped wrist pin swings under the connecting rod so that on the compression stroke the two bearings of the wrist pin are nearly in line with the bearings of the crank and connecting rod.

It will be understood that I do not wish to be limited to the particular inclination of the cam face 22 as illustrated, nor to the particular shape of this cam face, as the shape and inclinaion of this cam face will depend upon the length of the connecting rod, the length of the wrist pin, crank 18, and other factors. It may be stated that this device will secure a high degree of efficiency from a motor running at low speeds because of the leverage which is exerted upon the crank, no matter how slow the engine may be running.

While I have illustrated and described my invention as applied to a four cycle gas engine, it may also be applied to other forms of engine or in any other circumstances where it is desirable that a body shall be held in a relatively fixed position while its actuating crank is passing from a dead center to an off center position.

I claim:—

1. The combination with a rotatable element and a body reciprocated thereby, of a connecting rod operatively connected to the rotatable element, the reciprocatable body having a cam-faced element with which the extremity of the connecting rod engages, means swingingly connecting the connecting rod to the reciprocatable element, and means yieldingly resisting longitudinal movement of the connecting rod away from the reciprocatable element.

2. The combination with a rotatable element and a body reciprocated thereby, of a connecting rod operatively connecting the body and rotatable element, means whereby the connecting rod may have limited longitudinal movement with relation to the body when the rotatable element and connecting rod are moving from a dead center to a position off center, and means whereby the connecting rod may relatively shift the body inward while the connecting rod is moving outward, the connecting rod at all times having immediate engagement with the end of the body.

3. The combination with a rotatable element and a body reciprocated thereby, of a connecting rod operatively connecting the body and the rotatable element, the rod being operatively connected to the body to permit limited longitudinal movement of the rod relative to the body upon a movement of the rotatable element and rod past the dead center, the body being formed with a cam face with which the rod engages as the rod moves outward from its dead center through a predetermined angular extent whereby to hold the body in a relatively fixed position until the rod reaches a predetermined position beyond the dead center.

4. The combination with a rotatable element and a body reciprocated thereby, of a connecting rod between the body and the rotatable element, a wrist pin on the body with which the rod has engagement, said wrist pin having a limited movement relative to the body, the rod being extended beyond the wrist pin and the inner face of the body being formed to provide a cam with which the inner end of the rod engages as the rod passes outward from its dead center to a predetermined angular extent, said cam face being formed to urge the body and the body in relatively opposite directions during said movement.

5. The combination with a rotatable element and a body reciprocated thereby, of a connecting rod between the body and the rotatable element, a crank-shaped wrist pin mounted upon the body, the connecting rod having engagement with said crank-shaped wrist pin, that face of the body towards the wrist pin being formed with a cam face and extending laterally and towards the wrist pin, the extremity of the connecting rod being formed to engage the cam face as the rod shifts from a dead center outward to a predetermined angular position.

6. The combination with a crank shaft and a hollow piston, of a connecting rod operatively connected to the crank shaft and having its opposite end disposed within the piston, a crank shaft forming a wrist pin and to the crank of which the connecting rod is rockingly engaged, a spring engaging the piston with the connecting rod and urging the piston towards the connecting rod, and a roller mounted upon the inner end of the connecting rod, the head of the piston upon this inner face being formed with an outwardly and laterally directed cam face disposed at an angle to the axis of the piston and with which said roller engages.

7. The combination with a crank shaft and a hollow piston, of a connecting rod operatively connected to the crank shaft and having its opposite end disposed within the piston, a crank shaft forming a wrist pin and to the crank of which the connecting rod is rockingly engaged, a spring engaging the piston with the connecting rod and urging the piston towards the connecting rod, a roller mounted upon the inner end of the connecting rod, the head of the piston upon its inner face being formed with an outwardly and laterally directed cam face disposed at an angle to the axis of the piston and with which said roller engages, and a spring operatively connecting the connecting rod to the piston and yieldingly holding said roller in engagement with the cam face of the piston.

8. The combination with a crank shaft and a hollow piston, of a connecting rod between the piston and the crank shaft, a crank-shaped wrist pin mounted in the piston and operatively engaging the connecting rod, the extremity of the connecting rod carrying a roller, the inner face of the head of the piston being transversely inclined to the axis of the piston to thereby provide a cam surface conforming to the line of the roller as the connecting rod moves from its dead center outwardly and laterally, and a pair of springs engaging the connecting rod and engaged with the wall of the piston on that side of the connecting rod upon which the crank-shaped wrist pin is mounted.

9. The combination with a crank shaft, a cylinder and piston operating therein, a connecting rod operatively connected to the piston and crank shaft, of means for causing the piston to move into the cylinder at the same speed as the connecting rod during the time that the crank and connecting rod are moving to their dead center positions, and means then causing the piston to move out of the cylinder at a less speed than the connecting rod while the connecting rod and crank are moving from a dead center to a position off center, and means then acting to cause the piston to move with the crank rod and at the same speed thereof out of the cylinder.

In testimony whereof I hereunto affix my signature in the presence of two witnesses.

ERNEST L. YOUNG.

Witnesses:
 GEORGE EADY,
 R. B. SQUIRES.